United States Patent
Yanahara et al.

(10) Patent No.: US 11,986,984 B2
(45) Date of Patent: May 21, 2024

(54) INJECTION MOLDING SYSTEM, CONVEYING APPARATUS, AND MOLD EXCHANGE METHOD

(71) Applicant: Canon Virginia, Inc., Newport News, VA (US)

(72) Inventors: Yuichi Yanahara, Moriyama (JP); Koki Kodaira, Tokyo (JP)

(73) Assignee: Canon Virginia, Inc., Newport News, VA (US)

( * ) Notice: Subject to any disclaimer, the term of this patent is extended or adjusted under 35 U.S.C. 154(b) by 0 days.

(21) Appl. No.: 17/622,170

(22) PCT Filed: Jun. 23, 2020

(86) PCT No.: PCT/US2020/039202
§ 371 (c)(1),
(2) Date: Dec. 22, 2021

(87) PCT Pub. No.: WO2020/263869
PCT Pub. Date: Dec. 30, 2020

(65) Prior Publication Data
US 2022/0410452 A1    Dec. 29, 2022

Related U.S. Application Data

(60) Provisional application No. 62/867,716, filed on Jun. 27, 2019.

(51) Int. Cl.
*B29C 33/30* (2006.01)
*B29C 45/17* (2006.01)

(52) U.S. Cl.
CPC ...... *B29C 45/1756* (2013.01); *B29C 45/1742* (2013.01)

(58) Field of Classification Search
None
See application file for complete search history.

(56) References Cited

U.S. PATENT DOCUMENTS

| | | | |
|---|---|---|---|
| 4,472,127 A | 9/1984 | Cyriax et al. | |
| 5,096,404 A * | 3/1992 | Janos | B29C 45/1756 425/589 |
| 5,580,587 A | 12/1996 | Leonhartsberger et al. | |

(Continued)

FOREIGN PATENT DOCUMENTS

| | | |
|---|---|---|
| CN | 107584725 A | 1/2018 |
| JP | 6121601 B1 | 4/2017 |

*Primary Examiner* — Emmanuel S Luk
*Assistant Examiner* — Debjani Roy
(74) *Attorney, Agent, or Firm* — Canon U.S.A., Inc., IP Division

(57) ABSTRACT

An injection molding system including an injection molding apparatus and a conveying apparatus for conveying a mold with respect to the injection molding machine, the conveying apparatus including a support member for supporting a bottom of the mold, and a guide member located on a side of the mold for guiding the mold conveyed by the conveying apparatus, wherein the improvement to the conveying apparatus includes an adjustment member for adjusting a position of the guide member in a direction intersecting a direction of conveyance of the mold by the conveying apparatus independently from a position of the supporting member.

14 Claims, 13 Drawing Sheets

(56) References Cited

U.S. PATENT DOCUMENTS

| | | | |
|---|---|---|---|
| 5,772,420 A * | 6/1998 | Holmes | B29C 45/1761 |
| | | | 425/588 |
| 6,883,583 B2 | 4/2005 | Matsuura et al. | |
| 11,104,050 B2 | 8/2021 | Nakamura | |
| 11,220,031 B2 * | 1/2022 | Tuong The | B29C 33/30 |
| 2018/0009146 A1 * | 1/2018 | Nakamura | B29C 45/80 |
| 2019/0152102 A1 | 5/2019 | Kitaura | |

* cited by examiner

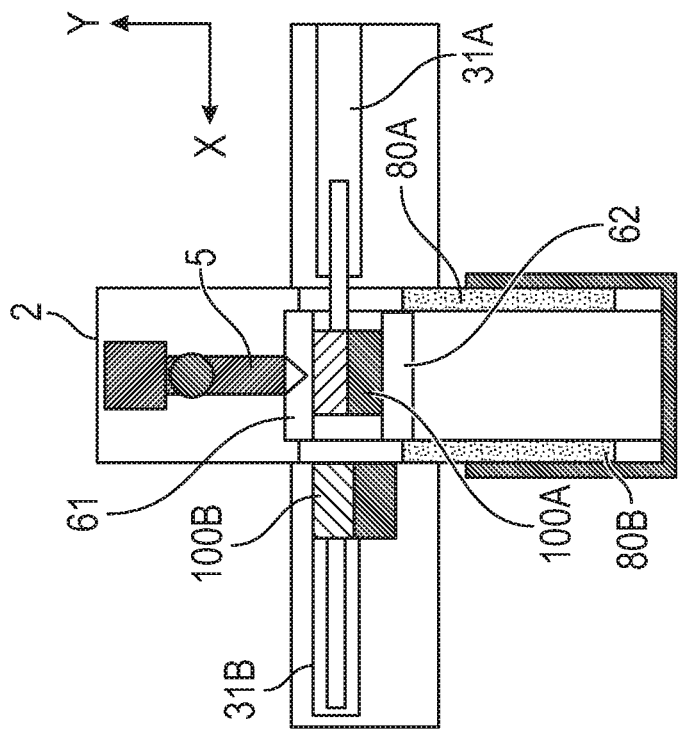
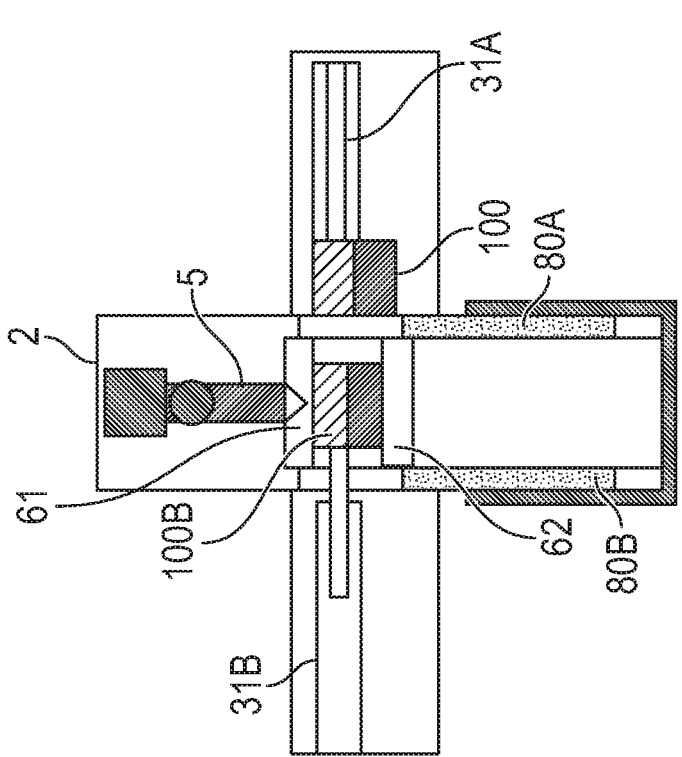
FIG. 6B
FIG. 6A

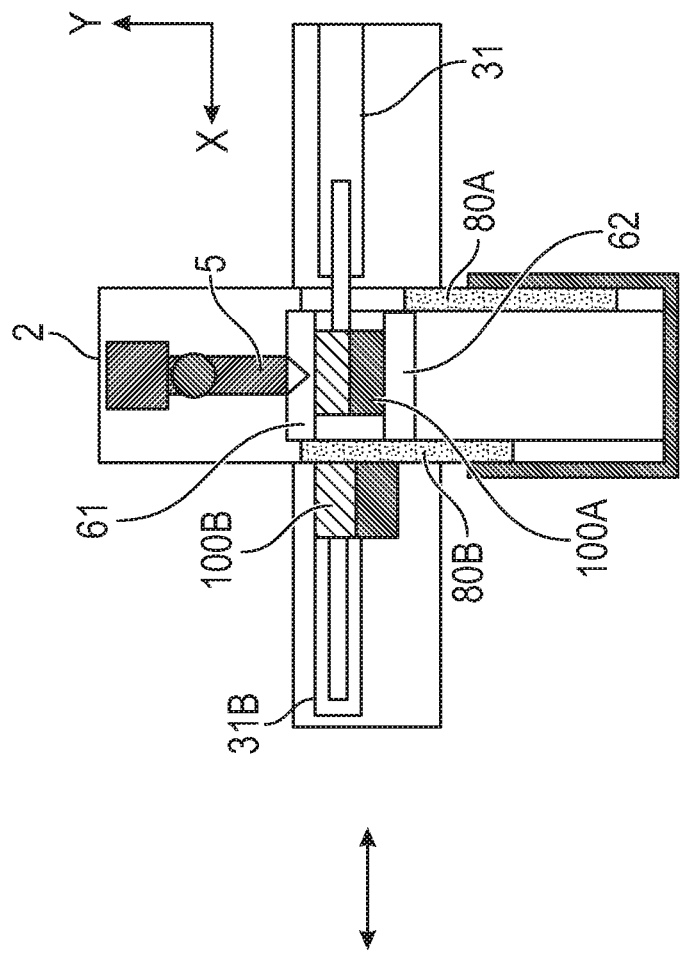
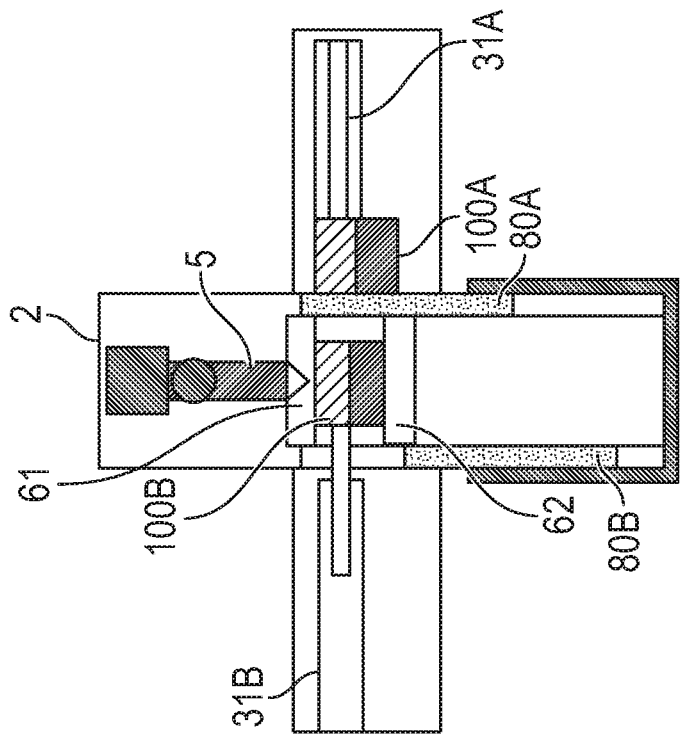

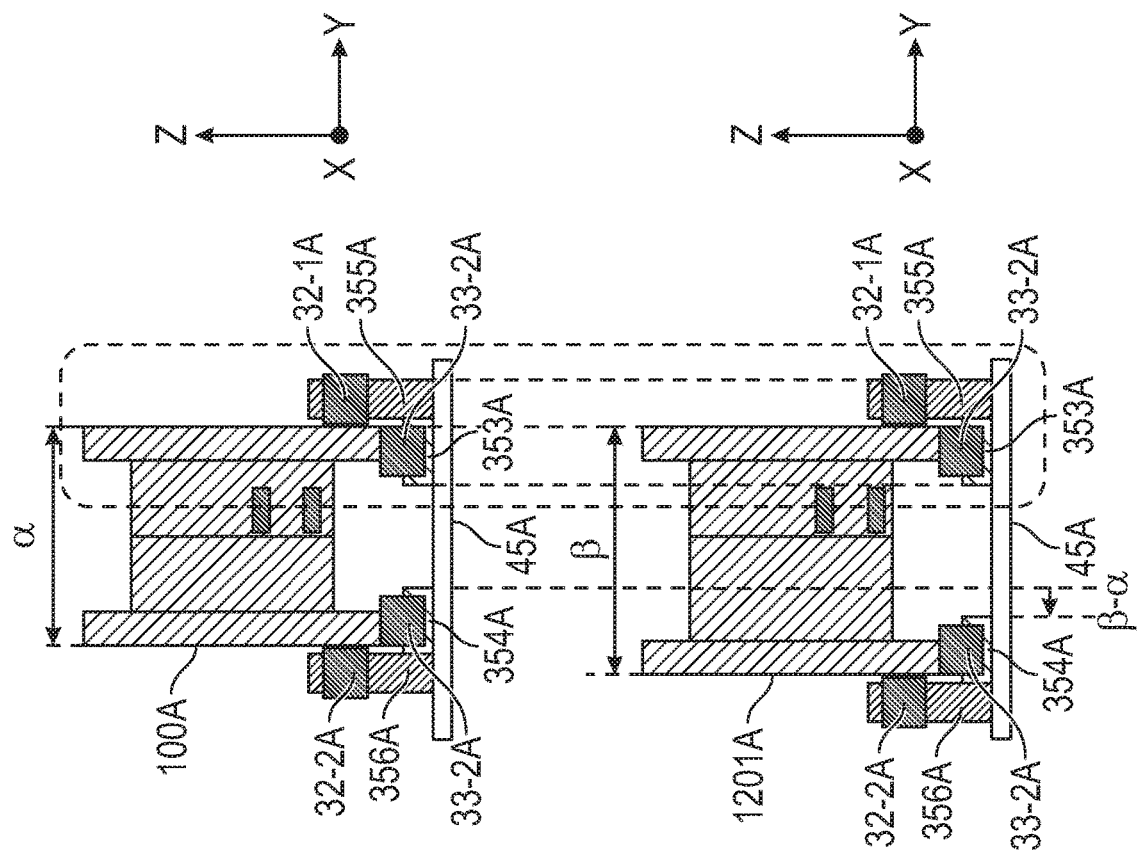
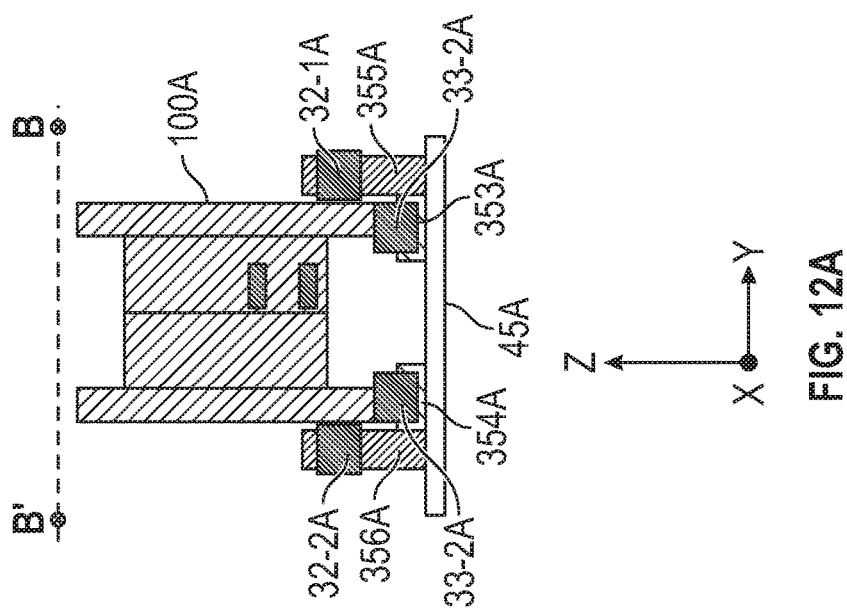
FIG. 12A
FIG. 12B

US 11,986,984 B2

INJECTION MOLDING SYSTEM, CONVEYING APPARATUS, AND MOLD EXCHANGE METHOD

CROSS-REFERENCE TO RELATION APPLICATION

This application claims the benefit of U.S. Provisional Application 62/867,716, which was filed on Jun. 27, 2019.

FIELD

The present disclosure relates to an injection molding system including a conveying apparatus for conveying the mold into and out of an injection molding apparatus, the conveying apparatus, and a mold exchange method with the injection molding system.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In this type of molding approach, a method that uses two molds with one injection molding machine in order to enhance productivity has been proposed. For example, US 2018/0009146/Japanese patent publication No. 2018-001738/VN20160002505 are seen to discuss a system in which conveying machines 3A and 3B are arranged on both sides of an injection molding machine 2. FIG. 18 illustrates an injection molding system of US 2018/0009146/Japanese patent publication No. 2018-001738/VN20160002505. In this system, molded parts are manufactured while alternating a plurality of molds by the conveying machines 3A and 3B for the one injection molding machine 2, where an actuator for moving the molds is located next to the molds in a conveying direction of the molds.

In a manufacturing facility multiple different molds are sometimes used with one injection molding machine, and the different molds can vary in size, especially in their width in the clamping direction of the injection molding machine. Therefore, what is needed is a conveying machine that can handle molds with varying widths.

SUMMARY

According to at least one aspect of the present disclosure, an injection molding system including an injection molding apparatus and a conveying apparatus for conveying a mold with respect to the injection molding machine, the conveying apparatus including a support member for supporting a bottom of the mold, and a guide member located on a side of the mold for guiding the mold conveyed by the conveying apparatus, wherein the improvement to the conveying apparatus includes an adjustment member for adjusting a position of the guide member in a direction intersecting a direction of conveyance of the mold by the conveying apparatus independently from a position of the supporting member.

Embodiments, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIGS. 6A and 6B illustrate an operation of an injection molding machine in a first mode.
FIGS. 7A and 7B illustrate an operation of an injection molding machine in a second mode.
FIGS. 12A and 12B are side views of a conveying machine according to another exemplary embodiment.

Figure 1:
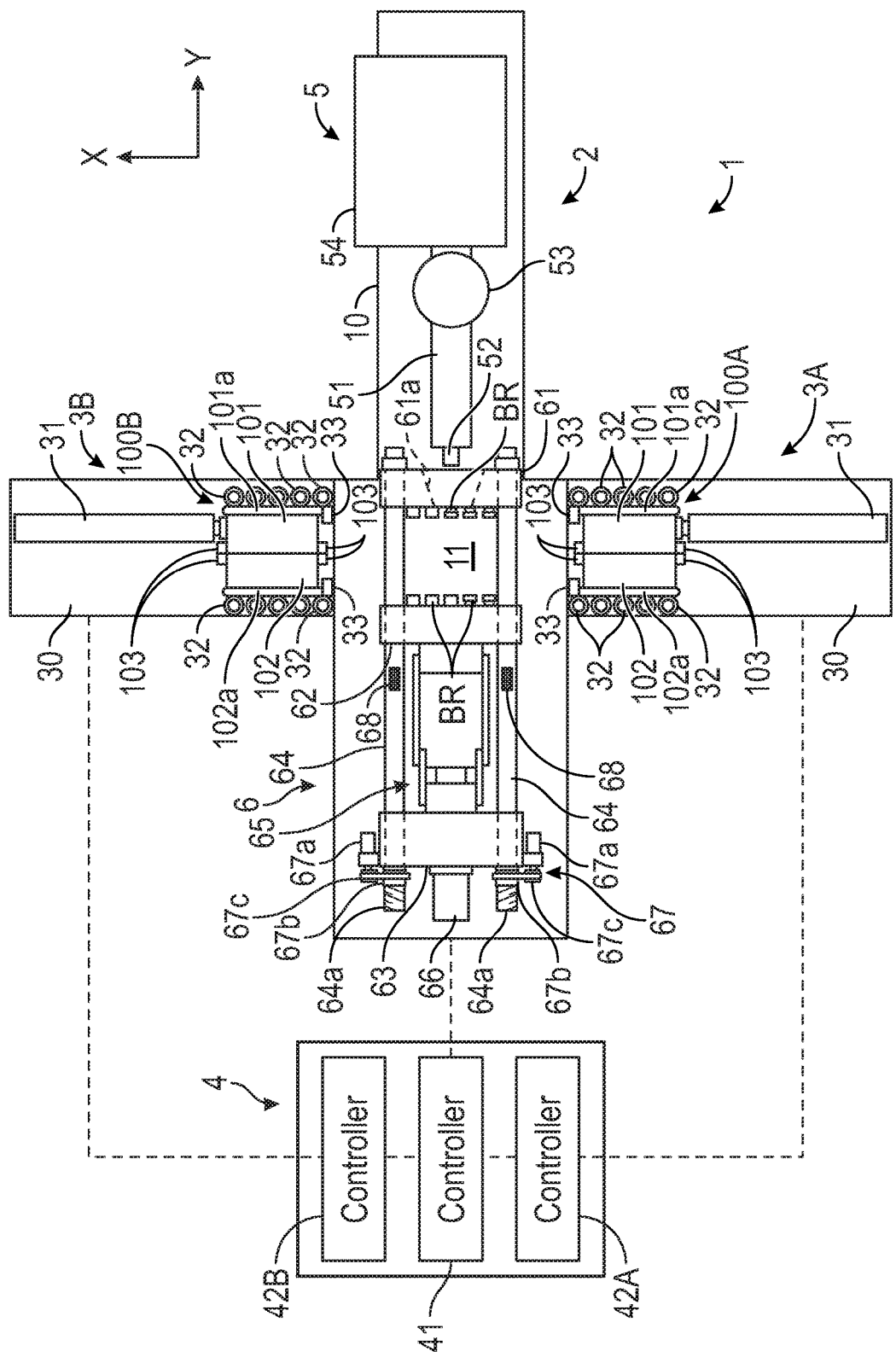
FIG. 1 illustrates an injection molding system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF THE EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, the arrow symbols X and Y in each Figure indicate horizontal directions that are orthogonal to each other, and the arrow symbol Z indicates a vertical (upright) direction with respect to the ground.

FIGS. 1-4 illustrate injection molding system 1 of US 2018/0009146/Japanese patent publication No. 2018-001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the injection molding machine.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

Figure 2:
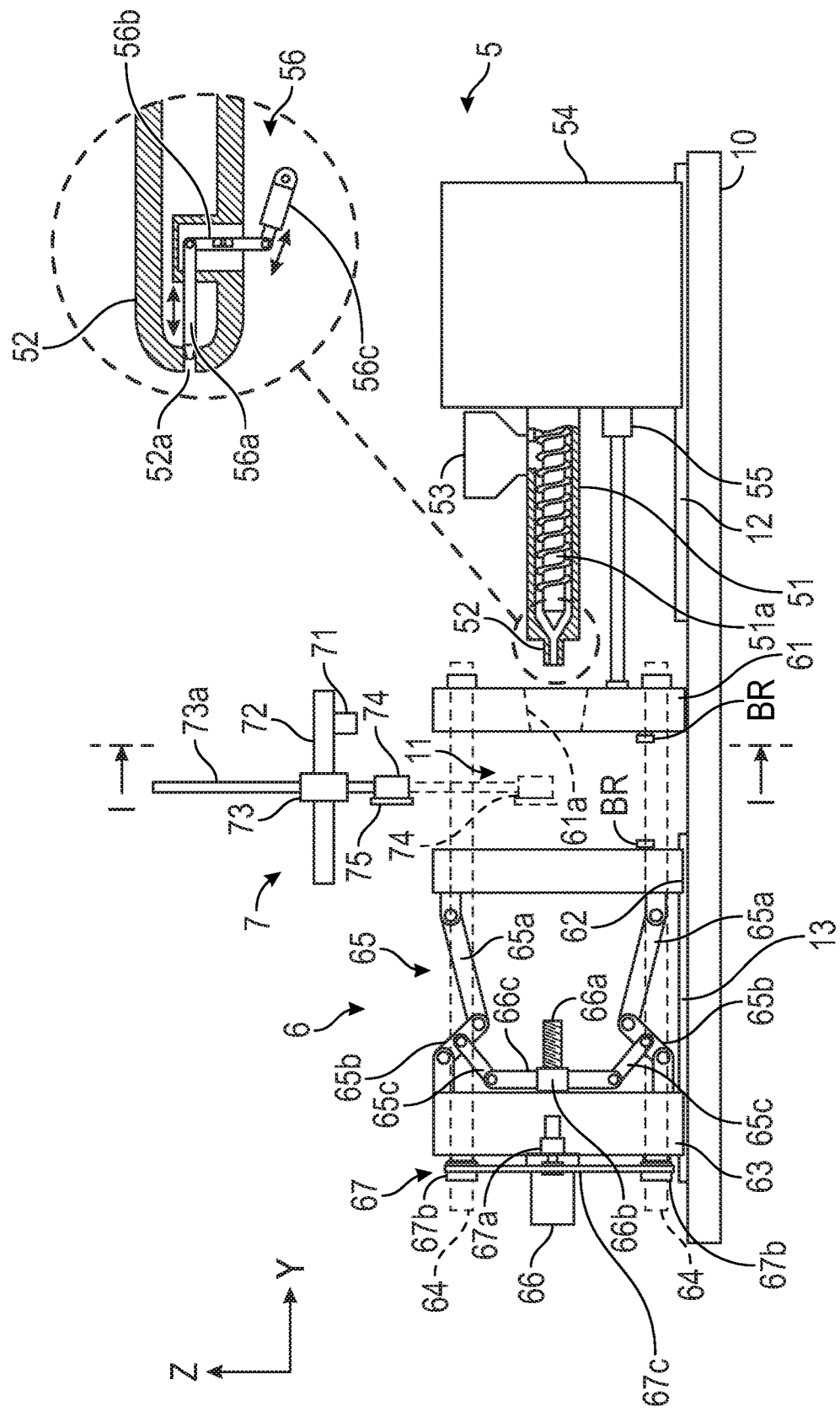
FIG. 2 is a side view of an injection molding machine.
Figure 3:
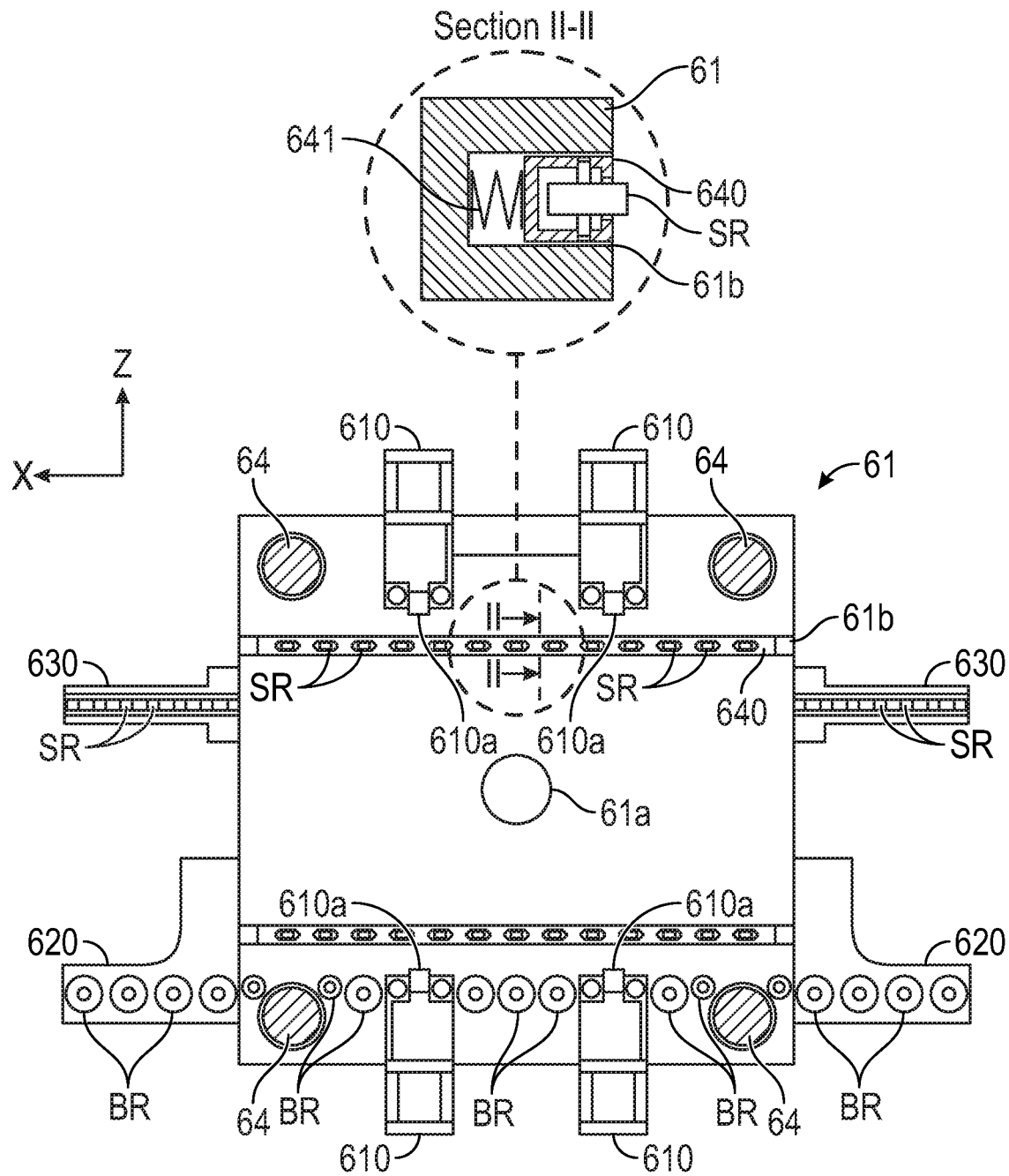
FIG. 3 is an end view of a fixed platen and a figure viewing from the arrow direction of the I-I line in FIG. 2.
Figure 4:
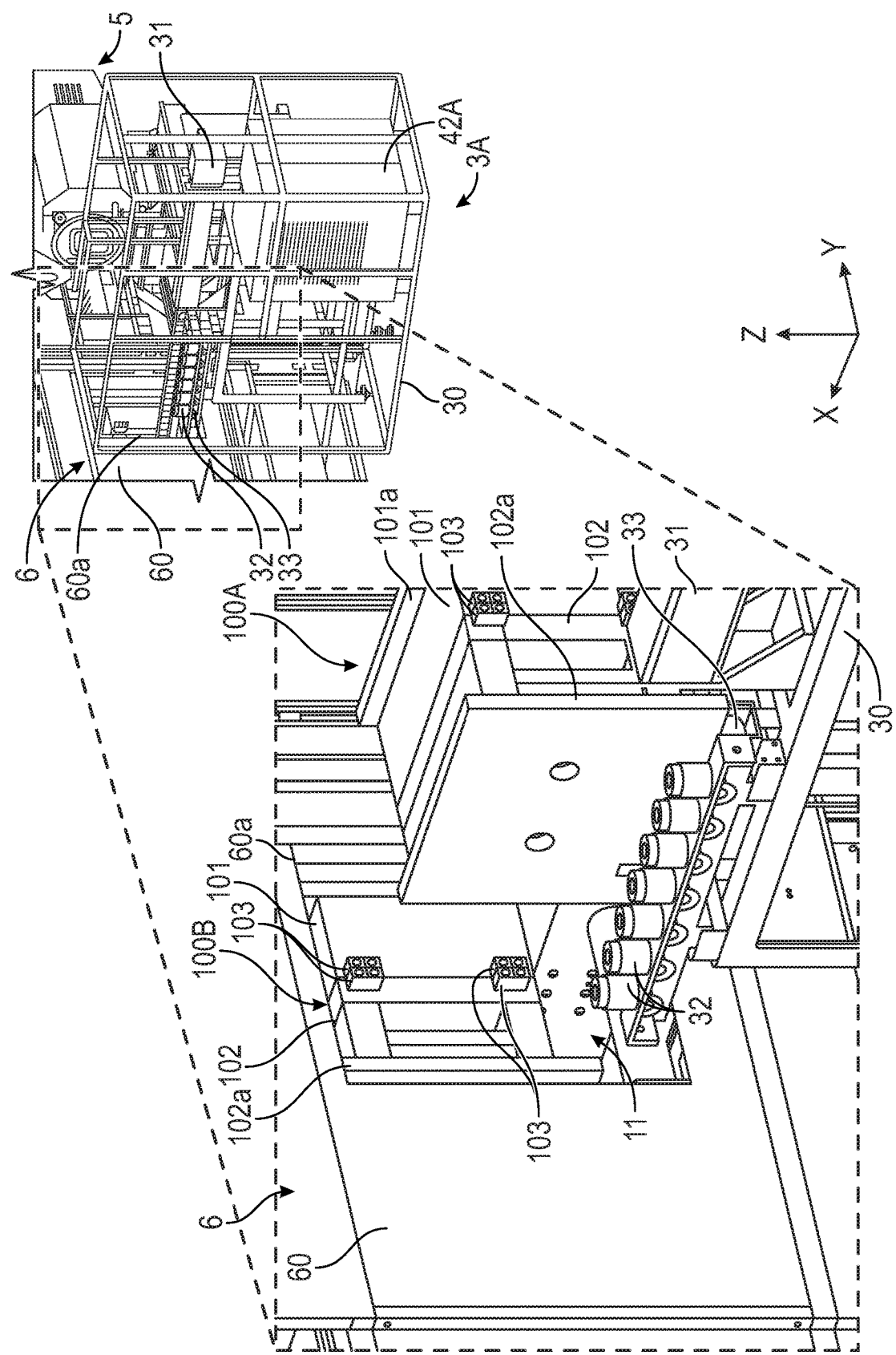
FIG. 4 is a partial perspective view of the injection molding system.

FIG. 2 illustrates a side view of the injection molding machine 2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 1 and FIG. 2, the injection molding machine 2 includes an injecting apparatus 5, a clamping apparatus 6, and a take-out robot 7 for ejecting a molded part. The injecting apparatus 5 and the clamping apparatus 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y-axis direction) of the screw 51a, it is possible to inject a molten resin from an injection nozzle 52.

In FIG. 2, an example of a shut-off nozzle as the nozzle 52 is illustrated. For an opening/closing mechanism 56 of FIG. 2, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y-axis direction along a rail 12 on the frame 10, and in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The injection molding machine 2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620.

On the inner surface of the fixed platen 61, grooves 61b that extend in the X-axis direction are formed.

The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping.

On both sides in the X-axis direction of the fixed platen 61, a roller supporting body 630 is fixed, and a plurality of rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610a that engages with the clamping plate 101a, and a built-in actuator (not illustrated) that moves the engaging portion 610a between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

As illustrated in FIG. 4, the periphery of the clamping apparatus 6 is surrounded by a cover (exterior covering plate) 60 for safety, but openings 60a through which the mold 100A/100B pass are formed on the sides of the molding operation position 11 for alternating the mold 100A/100B. Each opening 60a is typically continuously open, enabling free removal and insertion of the mold 100A/100B from and to the molding operation position 11.

Returning to FIG. 2, the take-out robot 7 will now be described. The take-out robot 7 includes a rail 71 that extends in the X-axis direction, and a movable rail 72 that can move in the X-axis direction on the rail 71. The movable rail 72 is arranged to extend in the Y-axis direction, and a slider 73 is arranged on the movable rail 72. The slider 73 moves in the Y-axis direction guided by the movable rail 72, and moves up and down an elevating shaft 73a in the Z-axis direction. On a lower end of the elevating shaft 73a, a vacuum head 74 is arranged, and on the vacuum head 74, a chuck plate 75 specialized to a molded part is mounted.

The take-out robot 7, after opening, moves the vacuum head 74 between the fixed mold 101 and the movable mold 102 as illustrated by broken lines in FIG. 2 by the rail 71, the movable rail 7, and the slider 73, sticks to the molded part, and conveys it outside the mold 100A/100B.

Figure 5:
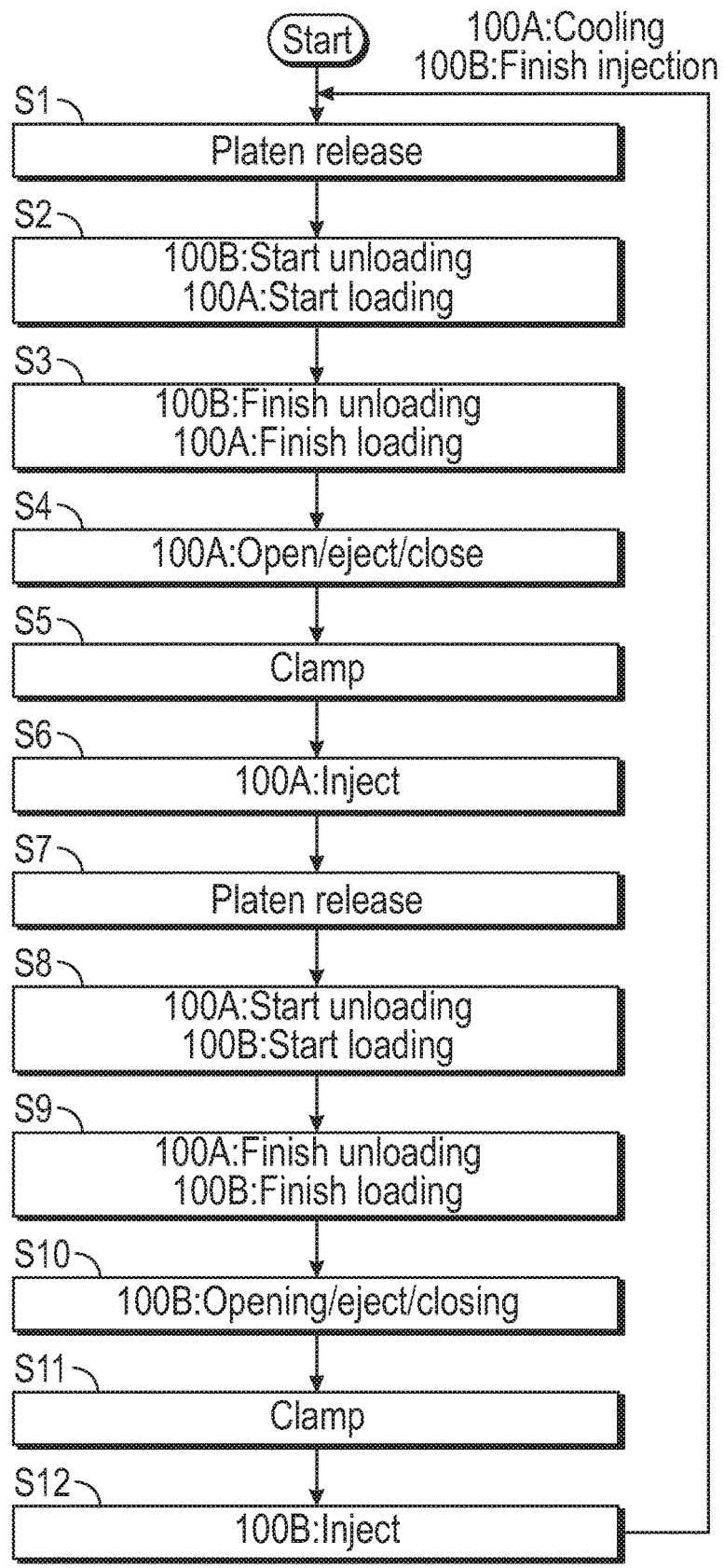
FIG. 5 is a flow diagram illustrating an exemplary processing for an injection molding system.

FIG. 5 is a flow diagram illustrating an exemplary processing for an injection molding system.

At the beginning of the flowchart, the mold 100A is conveyed out of the molding operation position 11 and cooled. The mold 100B is conveyed to the molding operation position 11 and the injection operation for the mold 100B is finished.

In S1, the clamping of the mold 100B is released. More specifically, the moveable platen 62 is slightly moved and it becomes possible to move the mold 100B.

In S2, unloading of the mold 100B and loading of the mold 100A begins. The mold 100B moves from the molding operation position 11 onto the conveying machine 3B. In parallel, the mold 100A moves from the conveying machine 3A to the molding operation position 11. It is preferable to start the unloading operation a little earlier than the loading operation to avoid the molds from contacting each other.

In S3, the unloading of the mold 100B and loading of the mold 100A is completed.

At this time, the mold 100B is on the conveying machine 3B, while at least a part of the mold 100B is in the injection molding machine 2. In S4, the mold 100A is opened, a molded part is ejected from the mold 100A, and the mold 100A is closed. S3 and S4 enable opening the mold 100A even though the mold 100B is not completely outside the injection molding machine 2.

In S5, the mold 100A is clamped by clamping apparatus 6. Then, in S6, injection into the mold 100A is performed. In S7, the moveable platen 62 is moved as described above in S1. This enables moving the mold 100A.

In S8, unloading of the mold 100A and loading of the mold 100B begins. This results in the mold 100A moving from the molding operation position 11 to a table 45 of conveying machine 3A. In parallel, the mold 100B moves from a table 45 of the conveying machine 3B to the molding operation position 11.

In S9, unloading of the mold 100A and loading of the mold 100B is completed. At this time, the mold 100A is on the conveying machine 3A and at least a part of the mold 100A is in the injection molding machine 2.

In S10, the mold 100B is opened, the molded part is ejected from the mold 100B, and the mold 100B is closed.

This enables opening the mold 100B even though the mold 100A is not completely outside the injection molding machine 2.

In S11, the mold 100B is clamped by the clamping apparatus 6. Then, in S12, the injection into the mold 100B is performed. The processing then returns to S1, and the injection molding is repeated until a number of molded parts manufactured by the injection molding system reaches a predetermined number.

FIGS. 6A and 6B and FIGS. 7A and 7B illustrate two operation modes of the injection molding machine 2. The control apparatus 4 selects either a first operation mode or a second operation mode, and the injection molding machine 2 performs the selected mode.

FIGS. 6A and 6B illustrate the first mode. FIG. 6A illustrates a state where the mold 100B is conveyed to the molding operation position 11 in the injection molding machine 2 by the conveying machine 3B. FIG. 6B illustrates a state where the mold 100A is conveyed to the molding operation position 11 in the injection molding machine 2 by the conveying machine 3A.

The first mode is a mode that is performed by the flowchart illustrated in FIG. 5. That is, while one mold is cooled on a conveying machine, injection by the injection molding machine 2 with another mold is being performed in parallel. The processes in S4-S7 of FIG. 5 are performed with respect to the mold 100A in the state illustrated in FIG. 6A. The processes in S8-S9 are performed during a transition period from the FIG. 6A to FIG. 6B. The processes in S10-S12 and S1 are performed with respect to the mold 100B in the state illustrated in FIG. 6A. The processes in S2-S3 are performed during a transition period from FIG. 6A to FIG. 6B.

In both the states illustrated FIG. 6A and FIG. 6B, both the doors 80A, 80B are opened so that the molds 100A, 100B can be loaded and unloaded. In this state, the door 80A, 80B are partially opened, and a region of the mold 100A, 100B that is on the movable platen 62 and located at a side opposite to a side facing the fixed platen 61 is not accessible for operator by the partially closed door 80A, 80B. The movable platen 62 repeatedly moves in a clamping direction (+Y-axis direction) and an opening direction (−Y-axis direction) during the injection molding operation. With a partially opened door, the operator can avoid contacting the movable platen 62 while it moves.

FIGS. 7A and 7B illustrate the second mode. FIGS. 7A and 7B illustrate the same situation as FIGS. 6A and 6B, except for a position of the doors 80A, 80B. FIG. 7A illustrates a state where the mold 100B is conveyed to the molding operation position 11 in the injection molding machine 2 by the conveying machine 3B. FIG. 7B illustrate a state where the mold 100A is conveyed to the molding operation position 11 in the injection molding machine 2 by the conveying machine 3A.

The second mode is a mode where one cycle of the injection molding process including a cooling process, i.e., process to cool a mold after an injection molding process, completes at the molding operation position 11 in the injection molding machine 2. The cooling process is not performed on the conveying machine 3A, 3B, so the unloading process of the mold 100A, 100B after completing an injection and dwelling process and the loading process of the mold 100A, 100B before ejecting the molded part are not performed.

FIG. 7B illustrates a state where the injection molding cycle for the mold 100A is repeated a predetermined number of times. After the predetermined number of injection molding cycles has completed, the state illustrated in FIG. 7B transitions to the state illustrated in FIG. 7A.

FIG. 7B illustrates a state where the injection molding cycle for the mold 100B is repeated a predetermined number of times as with the mold 100A. After the predetermined number of injection molding cycles has completed by the predetermined number of times, the state illustrated in FIG. 7B transitions to the state illustrated in FIG. 7A.

In the state illustrated in FIG. 7B, in a case where the mold 100B on the conveying machine 3B is already used, the mold 100B is unloaded from the conveying machine 3B, a new mold is loaded to the conveying machine 3B, and preparation for the new mold 100B is performed by the operator while the injection molding for the mold 100A is performed. Preparation for the new mold 100B includes connecting an electric power cable and/or a hose for circulating cooling liquid for adjusting temperature of the mold 100B to the mold 100B.

When the mold 100B is unloaded from the conveying machine 3B, the electric power cable and hose are removed from the mold 100B. After preparation for the new mold 100B, the new mold 100B is conveyed to the molding operation position in the injection molding machine 2 by the conveying machine 3B after the injection molding operation for the mold 100A is performed. In the state illustrated FIG. 7A, the same operation is performed on the conveying machine 3A while the injection molding for the mold 100B is performed.

In the second mode, the conveying machine 3A, 3B is used for loading the mold 100A, 100B before the injection molding cycle starts and unloading the mold 100A, 100B after the injection molding cycle finishes. The conveying machine 3A, 3B does not move the mold 100A, 100B while one cycle of injection molding is performed like the first mode. The second mode is effective when a predetermined cycle number set for each of the molds is small. In other words, when small production is required and the injection molding is performed while the molds are frequently changed, which results in a large variety of production.

In the state illustrated in FIG. 7A, as the operator unloads a used mold, loads a new mold, and prepares for the new mold in the vicinity of the conveying machine 3B, a door 80B that faces the conveying machine 3B is closed. With this, it is possible to reduce a possibility that the operator accidentally contacts an operating mechanism of the injection molding systems 1. For example, safety is improved if the control apparatus 4 stops the injection molding with the mold 100A in a case where it is detected that the door 80B is opened while the injection molding with the mold 100A is performed. In another exemplary embodiment, a lock mechanism, such as an electric lock, can be provided at the door 80B. The lock mechanism can lock the door 80B while the injection molding with the mold 100A is performed.

In the state illustrated FIG. 7A, as the operator unloads a used mold, loads a new mold, and prepares for the new mold in the vicinity of the conveying machine 3A, a door 80A that faces the conveying machine 3A is closed. With this, it is possible to reduce a possibility that the operator accidentally contacts an operating mechanism of the injection molding system 1. For example, safety is improved if the control apparatus 4 stops the injection molding with the mold 100B in a case where it is detected that the door 80A is opened while the injection molding with the mold 100B is performed. In another exemplary embodiment, a lock mechanism, such as an electric lock, can be provided at the door 80A. The lock mechanism can lock the door 80A while the injection molding with the mold 100B is performed. A cover (not illustrated) can be provided with the door on the conveying machines 3A, 3B so that the cover surrounds the conveying machines 3A, 3B.

Figure 8:
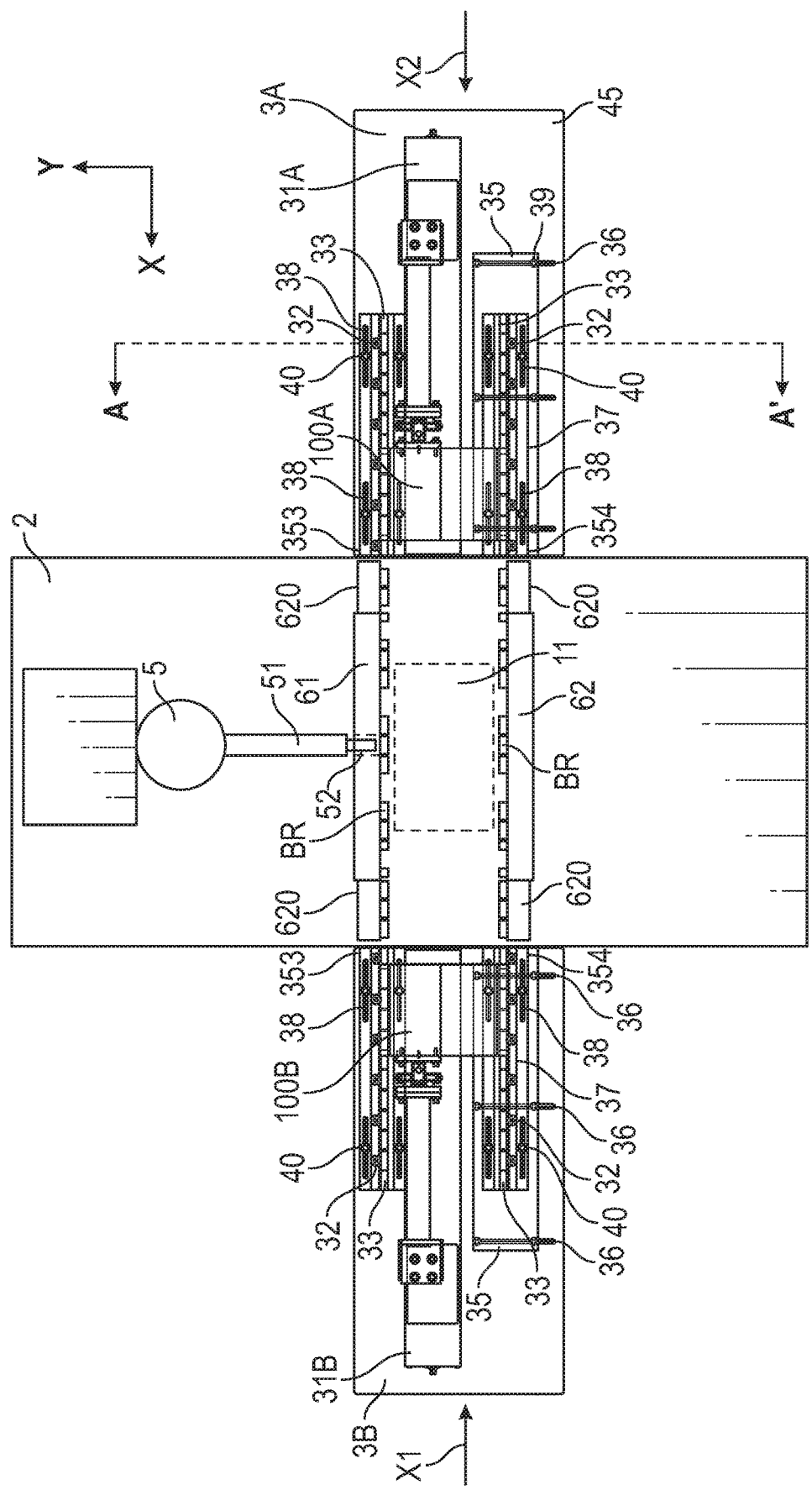
FIG. 8 illustrates an injection molding system.

FIG. 8 illustrates a top view of the injection molding systems 1 illustrated in FIG. 1 and is being provided just for description purposes. Only the improvements/differences from FIG. 1 that illustrate features of the present embodiment will be described below.

As illustrated in FIG. 8, support bases 353, 354 are provided on the table 45. The plurality of bottom rollers 33 and the plurality of side rollers 32 are provided on each of the support bases 353, 354. The supporting bases 353 is provided at a side of the fixed platen 61, and the support bases 354 is provided at a side of the movable platen 62.

The bottom rollers 33 are an example of a support member or a support mechanism for supporting the bottom of the mold 100A, 100B, which is conveyed by the conveying machine 3A, 3B. The side rollers 32 are an example of a guide member located on a side of the mold 100A, 100B and guide the mold 100A, 100B while the mold 100A, 100B is being conveyed by the conveying machine 3A, 3B.

Both the support bases 353, 354 include a slidable mechanism in the X-axis direction. A plate 37 is under the support bases 353, 354 respectively, and an elongated hole 38 in the X-axis direction is formed on the plate 37. Both the support bases 353, 354 can slide along the hole 38 and are fixed at an arbitrarily position to the table 45 by a fastening member 40. The plate 37 on the fixed mold's 101 side is also fixed onto the table 45.

The support base 354 is also slidable in the Y-axis direction. A plate 35 is provided between the plate 37 and the table 45. Elongated holes 36 are formed in the Y-axis direction on the table 45. The support base 354 can slide along the elongated holes 36 and is fixed at an arbitrarily position of the hole 36 to the table 45 by a fastening member 39. The plate 37 is fixed onto the plate 35.

Figure 9:
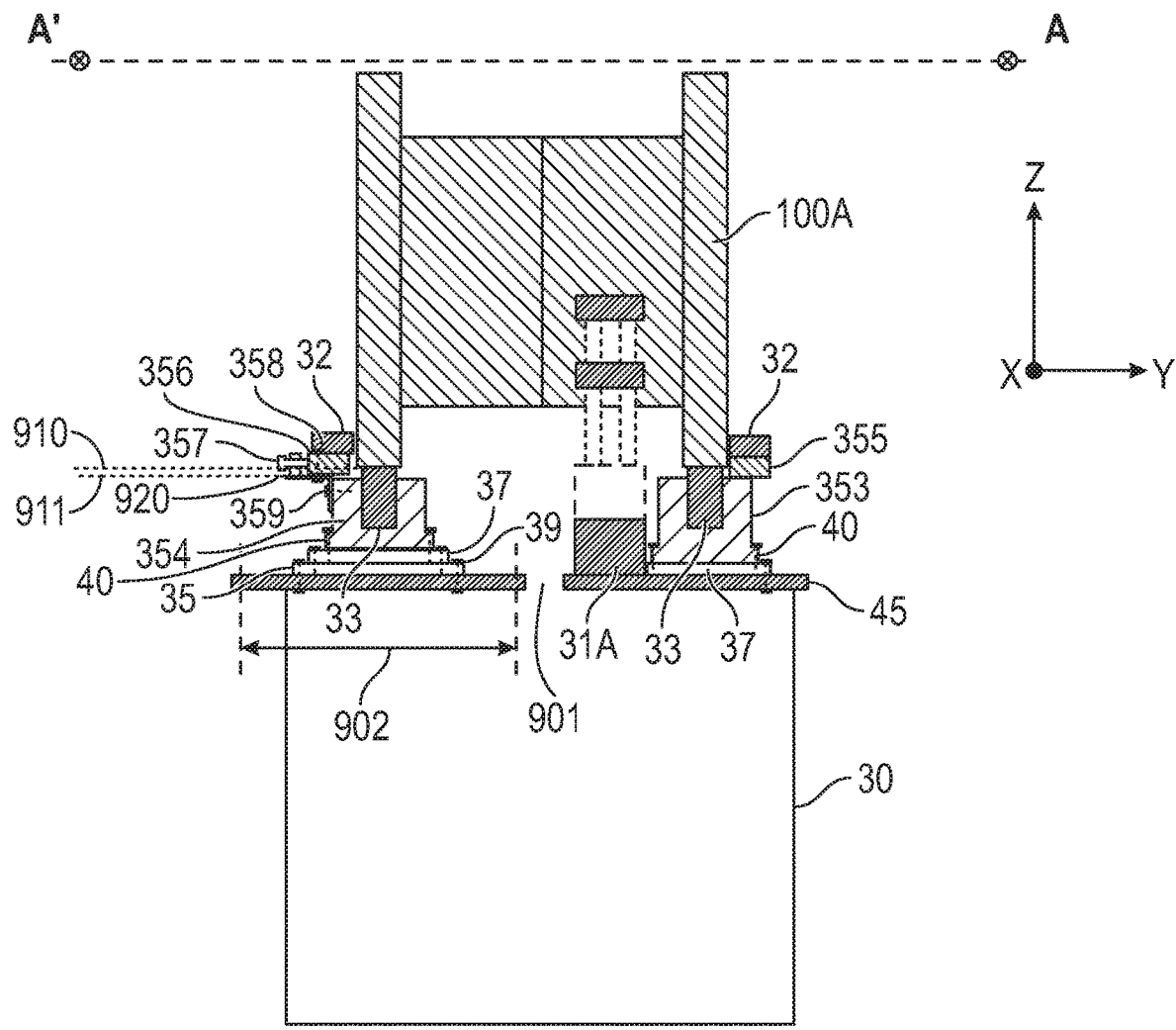
FIG. 9 is a side view of a conveying machine.

FIG. 9 illustrates adjusting the bottom rollers 33 and the side rollers 32 in the Y-axis direction. More specifically, FIG. 9 illustrates a side view of the injection molding system 1 when viewed from A-A' plane towards an X-axis positive direction. A part of the actuator 31A is illustrated with dotted lines because the part is on an X-axis negative side from the A-A' plane.

Both the support bases 353 and 354 are fastened (or fixed) on the table 45 via fastening members 39 or 40. The support base 353, which is on the fixed platen's 61 side or on the fixed mold's 101 side (hereinafter 'fixed side'), is fastened via a plate 37. The support base 354, which is on the movable platen's 62 side or on the movable mold's 102 side (hereinafter 'movable side') is fastened via a plate 35 and a plate 37 to the table 45 with fastening members 39 and 40. The table 45 includes one or more elongated holes 36 extending in a Y-axis direction (a clamping direction of the mold or the injection molding machine) formed on its surface. The elongated hole(s) enable an operator to fasten the support base 354 at an arbitrary point in the elongated hole(s) 36.

A combination of the table 45 with the elongated hole(s) 36 and the fastening member 39 function as an adjustment member or an adjustment mechanism for adjusting a position of the bottom rollers 33 and the support base 354 in a Y-axis direction.

The support member, the guide member and the adjustment member are not limited to the above-described configuration. According to another exemplary embodiment, the plate 37 and adjustment mechanism in the X-axis direction can be eliminated, and the conveying machine 3A, 3B need only include an adjustment mechanism in the Y-axis direction, including the elongated hole 36 on the table 45 and the fastening member 39 for fastening the table 45 and the support base 354.

The support bases 353 and 354 are further fixed with the guide bases 355 and 356, respectively, which support the multiple side rollers 32. The guide base 355 on the fixed side supports a row of the multiple side rollers 32, which is located on a fixed side of the mold 100A, 100B and can be in contact with the fixed side's side surface of the mold 100A, 100B. The guide base 356 supports another row of the multiple side rollers 32, which is located on a movable side of the mold 100A, 100B and can be in contact with the movable side's side surface of the mold 100A, 100B.

The manner in which the guide base 355 is fixed to the support base 353 is different from the manner in which the guide base 356 is fixed to the support base 354. The guide base 355 is fixed to the support base 353 with fastening members and no position adjustment mechanism for the guide base 355 with respect to the support base 353. The guide base 356 is detachably fixed to the support base 354 and is adjustable in a position in the Y-axis direction. As illustrated in FIG. 8, the length of the guide base 356 in the X-axis direction is substantially the same as the length of the support base 354, and these bases 356 and 354 cover substantially the same range of the conveyance path as defined by the bottom rollers 33 in the X-axis direction.

A temperature controller (not illustrated) that enables adjusting a temperature of the molds 100A, 100B is located along with the controllers 42A, 42B in a space that is enclosed by the frame 30 and under the table 45. A connecting unit 70 that connects a signal line from the controller 4 to the controllers 42A, 42B respectively is located under the table 45.

A hole 901 is formed on the table 45 in the center of the table 45 to secure a route for cables and hoses that connect the mold 100A, 100B with the controllers 42A, 42B and temperature controller. The hole 901 can be an elongated hole in the X-axis direction, which enables the cables and hoses to move along with the movement of the mold 100A, 100B. The cables and hoses can go through the hole 901 to access the controllers 42A, 42B and the temperature controller. The hole 901 should be a distance 902 from the support base 354, which is positioned on the fixed side with respect to the distance 902.

The hole 901 can also be positioned on the movable side with respect to the actuator 31A because the actuator 31A is usually connected to the fixed mold 101 and positioned on the fixed side, and there may not be sufficient space for the hole 901 between the actuator 31A and the support base 353. In another exemplary embodiment, the hole 901 can be formed between the actuator 31A and the support base 353 if there is enough space.

The support base 354 and the guide based 356 are fixed to each other with an L-shape bracket 920. A fastening member 359 fastens a first planar portion of the L-shaped bracket 920 with a side surface of the support base 354, and a fastening member 358 fastens a second planar portion of the L-shaped bracket 920 with a bottom surface of the guide base 356. An elongated hole is formed on the second planar portion of the L-shaped bracket 920, and the fastening member 358 goes through the elongated hole at an arbitrary point. The fastening member 358 includes, for example, a bolt and a nut, where the bolt is inserted from the guide base 356 at the top surface into the elongated hole and is engaged with the nut on the bottom surface of the second planar portion of the L-shaped bracket 920. By clamping the guide base 356 with the bolt and nut, the guide base 356 is fixed in the X-axis and Z-axis directions.

A positioning member 357 is fixed on the L-shaped bracket 920. The positioning member 357 includes a positioning screw and a fixture for the positioning screw, which is fixed on the surface of the second planar portion of the L-shaped bracket 920. The fixture includes a screw hole extending in the Y-axis direction, and the screw is movable along the screw hole in the Y-axis direction while the screw is engaged with the screw hole. As the screw rotates towards the Y-axis positive direction, the tip of the screw contacts the side surface of the guide base 356. If the screw is rotated more, the screw pushes the guide base 356 in the Y-axis positive direction, which adjusts the position of the guide base 356 and the side rollers 32 in the Y-axis positive direction with respect to the support base 354. Thus, the positioning member 357 fixes the guide base 356 in the Y-axis direction, which is also a clamping direction.

The guide base 356 and, the L-shaped bracket 920 and the positioning member 357 can be removed when the mold 100A, 100B is unloaded from the conveying machine 3A, 3B, and can be re-attached after a new mold is loaded instead of the mold 100A/100B. The removal and re-attachment procedures makes unloading and loading molds more efficient, especially when a mold is moved in the Y-axis direction for unloading and loading. In addition, even when molds are exchanged using a crane, the above-described procedures can reduce possible damage to the molds while being unloaded or loaded, to the side rollers 32, or to other structural components of the conveying machine.

The guide base 356 is detachably fixed to the support base 354 and the conveying machine 3A, 3B, and the position is independently adjustable from the bottom rollers 33. This enables adjusting position of the side rollers 32 such that the position of the guide base 356 is appropriately adjusted after a mold is loaded onto the conveying machine and is on the bottom rollers 33.

The guide base 356 fixed on the L-shaped-bracket 920 extends along the X-axis direction and the side rollers 32 on the guide base 356 are positioned along the X-axis direction at predetermined position intervals. The position intervals between two neighboring positioning members 357 can be longer than the length of a mold in the X-axis direction. In such a case, the positioning members 357 do not need to be removed when unloading or loading a mold from or onto a conveying machine. In this case, the operator just needs to remove the guide base 356 from the L-shaped bracket 920, before unloading a mold.

The position 910 in the Z-axis direction (vertical direction) of the top position of the bottom roller 33 on the movable side is higher than the position 911 in the Z-axis direction of the top surface of the L-shaped bracket 920. This can reduce possible damage caused by a mold being unloaded or loaded hitting the L-shaped bracket 920 on its corner.

Figure 10:
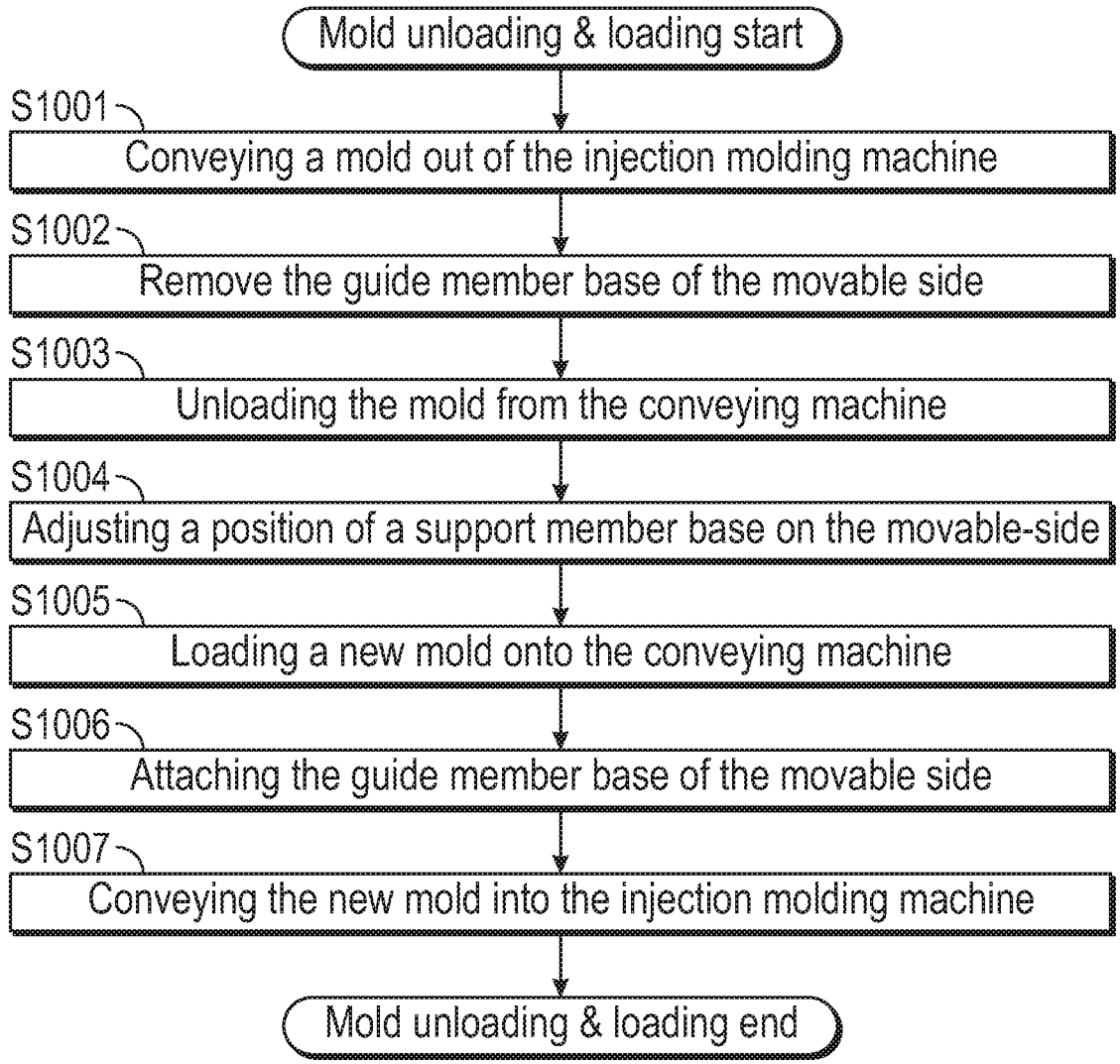
FIG. 10 is a flow diagram illustrating a process of exchanging molds at a conveying machine.

FIG. 10 illustrates the process of exchanging molds (mold setup process). The process includes conveying a mold out of the injection molding machine 2, unloading the mold, loading a new mold, and conveying the new mold into the injection molding machine 2 operated in a mode illustrated in FIGS. 7A and 7B. The process also includes a process of changing molds after completion of the injection molding in the injection molding machine 2 operated in a mode as illustrated in FIGS. 6A and 6B, and before another injection molding in the mode is re-started.

For description purposes, the process of exchanging molds will be described with respect to the conveying machine 3A. The process is also applicable to the conveying machine 3B.

The process illustrated in FIG. 10 begins after the completion of the injection molding with the mold 100A, and the mold 100A is ready to be conveyed out of the injection molding machine 2. The mold 100A will be replaced with a new mold different in width in the Y-axis (a clamping) direction.

Turning to FIG. 10, in step S1001, the conveying machine 3A conveys the mold 100A out of the injection molding machine 2 to position the mold 100A on a conveyance path of the conveying machine 3A. The mold 100A is moved to and stopped at a predetermined position on the actuator's 31A side with respect to the door 80A.

An operator then begins preparing for unloading the mold 100A from the conveying machine 3A. If the temperature of the mold 100A is controlled at a predetermined high temperature, the operator can wait until the temperature drops to a predetermined low temperature by turning the temperature controller off.

In step S1002, the operator removes the guide base 356, which is on the movable side, from the support base 354. This process removes structural components that were disposed on a side of the mold 100A, and entirely exposes the side surface of the mold 100A.

In step S1003 the operator unloads the mold 100A from the conveyance path of the conveying machine 3A. The mold 100A is moved along the Y-axis negative direction and is placed onto a movable cart positioned by the conveyor machine 3A.

In step S1004 the operator prepares for a new mold that is different in width from the mold 100A by adjusting the position of the support base 354 by moving it to the appropriate position. The plate 35 is positioned based on the width of the new mold in the X-axis direction, and the plate 35 is fastened to the table 45 with the fastening member 39.

In step S1005 the operator loads the new mold onto the conveying machine 3A. The new mold is moved in the Y-axis positive direction from the movable cart onto the conveying machine 3A and into the conveyance path of the conveying machine 3A. The new mold is placed on the conveying machine 3A so that the clamping plate 101a is on the bottom rollers 33 on the fixed side, and the clamping plate 102a is on the bottom rollers 33 on the movable side. The new mold is moved towards the side rollers 32 on the fixed side so as to contact the side rollers 32 or so as to have only a slight gap (e.g., appx ~1 mm) between the new mold and the side rollers 32. This is done to adjust the position of the side rollers on the movable side.

In step S1006 the operator attaches the guide base 356 to the support base 354. The operator rotates a positioning screw (not illustrated) of the positioning member 357 to adjust the position of the guide base 356 so that there is only a slight gap position of the guide base 346, and so that there is only a slight gap (e.g., appx 1 mm) between the side rollers 32 on the movable side and a clamping plate of the new mold. The side rollers 32, which is an example of a guide member, are located along a side of the new mold, and the new mold can be guided by the side rollers 32 on both sides.

In step S1007, the conveying machine 3A conveys the mold 100A into the injection molding machine 2 to position the mold at the molding operation position 11. Before this step is performed the movable platen 62 is adjusted by moving the position of the movable platen 62 for the new mold to be inserted, based on information of the new mold's width in the Y-axis direction.

The new mold is then clamped by the fixed platen 61 and the movable platen 62. Injection molding is started after various settings are performed by the injection molding machine 2, including an adjustment of a clamping pressure.

In the present embodiment, the above-described steps S1002 through S1006 are performed by an operator. In another exemplary embodiment, part or all of these steps can be performed by one or more robots.

In the above-described embodiments the table 45, the plate 35, and the L-shaped bracket 920 include an elongated hole for position adjustment in the X-axis and the Y-axis directions of the support base 354 or the guide base 356. In another exemplary embodiment, multiple holes can be arranged along a line and formed at predetermined position intervals on the table 45, plate 35, or the L-shaped bracket 920. The position adjustment in this embodiment is performed by selecting a hole out of the multiple holes to be engaged with a fastening member.

In the above-described embodiments, the positioning member is provided with the guide base 356 for its position adjustment. In another exemplary embodiment, the positioning member can be eliminated from the conveyor machine 3A, 3B. In this case, the L-shaped bracket 920 does not include an elongated hole, but includes a single circle hole to be engaged with a fastening member for fixing the guide base 356 to the support base 354.

In the above-described embodiments the support base 354 is fixed onto the table 45 via the plates 35 and 37. In another exemplary embodiment, multiple pillar members with a circular or rectangular horizontal cross-section can be arranged along the X-axis direction at predetermined position intervals and fixed on the table 45, where the support base 354 is fixed on the top surfaces of the pillar members. In this case, a fixture plate with a larger horizontal cross-section than that of the pillar member is fixed on the bottom of each of the pillar members, and the fixture plate is fixed to the table 45 with the fastening member engaging with the elongated hole 36.

This configuration can be advantageous in terms of material or parts cost when the conveyance path needs a predetermined height above the table 45 because it reduces volume or weight of total parts required to configure the conveyance path. It may also be easier to configure conveying machines for various injection molding machines different in height of the insertion position of a mold, by selecting appropriate pillar members for injection molding machines.

In yet another exemplary embodiment, the length of the guide base 356 in the X-axis direction can be made shorter than the support base 354 by at least a length of a mold in the X-axis direction. Unloading and loading of molds can be performed at a location where there is no guide base 356. This enables unloading and loading of molds without removing and re-attaching the guide base 356.

Figure 11:
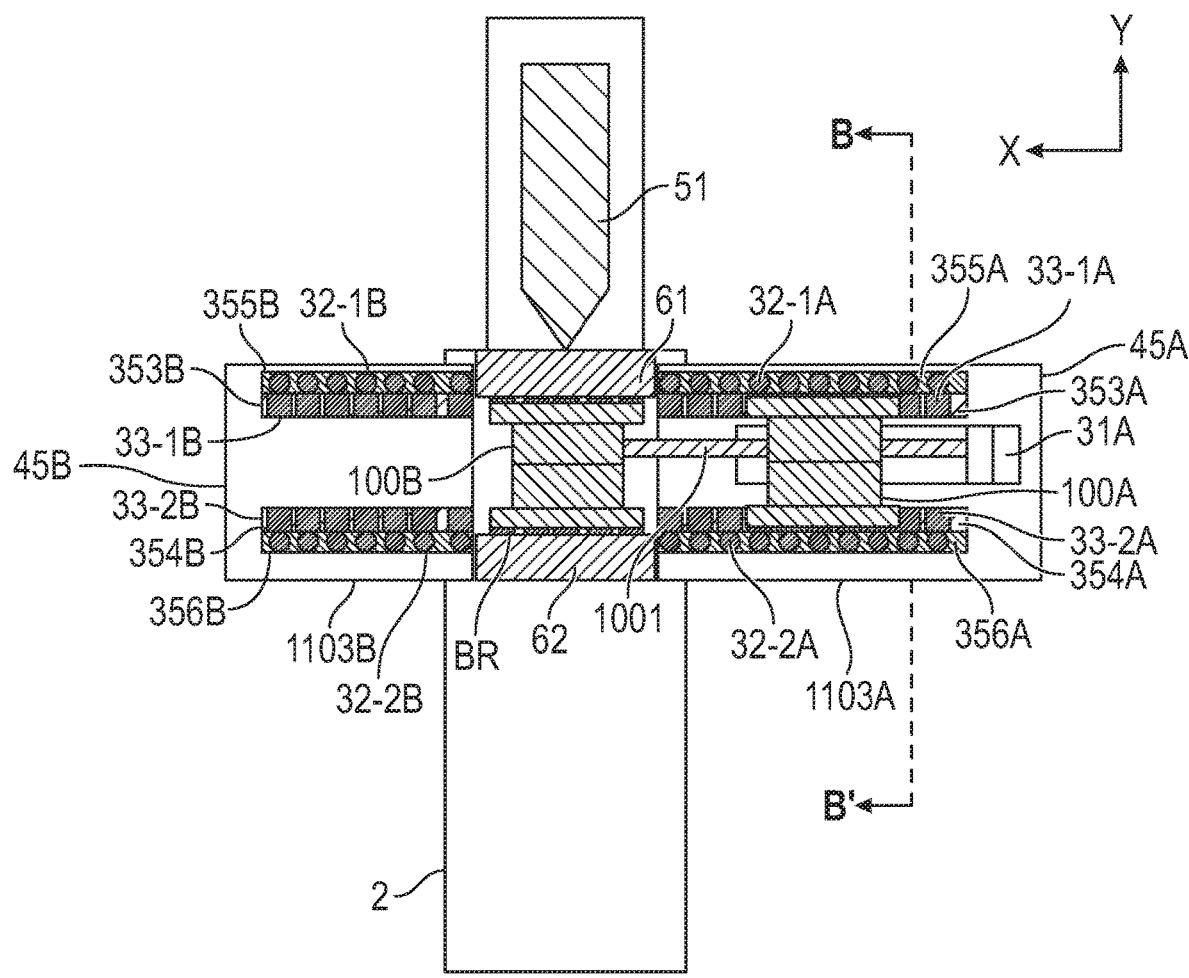
FIG. 11 illustrates an injection molding system according to another exemplary embodiment.

FIGS. 11 and 12A illustrate an injection molding system according to another exemplary embodiment. The injection molding system includes conveying machines 1103A and 1103B. FIG. 11 illustrates the injection molding system while FIG. 12A illustrates is a side view from the B-B' plane towards the X-axis positive direction. The same components as described above have the same reference numbers, and as such, their descriptions may be omitted unless there is any difference from what is described above.

The conveying machine 1103A includes actuator 31A as described above, which is connected to the mold 100A, but the conveying machine 1103B does not include an actuator. The mold 100A and the mold 100B are fixed together with a connection member 1001, where power from the actuator 31 is transmitted to the mold 100B via the mold 100A and the connection member 1001.

The conveying machine 1103A includes a row of multiple bottom rollers 33-1A and a row of multiple bottom rollers 33-2A, which are examples of rows of the support members for supporting the bottom of the mold 100A. The conveying machine 1103A also includes a row of multiple side rollers 32-1A and a row of multiple side rollers 32-2A, which are examples of rows of the guide members located on each side of the mold 100A and guide the mold 100A. The rollers 33-1A, 33-2A, 32-1A and 32-2A define a conveyance path of the mold 100A.

The clamping plate 101a of the mold 100A is supported on the bottom rollers 33-1A on the fixed side and the clamping plate 102a of the mold 100A is supported on the bottom rollers 33-2A on the movable side. The multiple rollers 33-1A are fixed on a support base 353A that is on the fixed side, and the multiple rollers 33-2A are fixed on a support base 354A. The side rollers 32-1A are fixed on a guide base 355A that is on the fixed side, and the side rollers 32-2A are fixed on the guide base 356A that is on the movable side.

As described above, the support base 353A is a physically different component from the guide base 355A, and the support base 354A is a physically different component from the guide base 356A. The guide bases 354A or 356A are not fixed on the support bases 353A or 354A, but are fixed directly onto the table 45. In another exemplary embodiment, the support base 353A can be a single component with the guide base 355A, and the support base 354A can be a single component with the guide base 356A. In addition, whereas in the above described embodiments the bottom rollers 33 are fixed and supported at both sides, in the present embodiment, the bottom rollers 33-1A and 33-2A are fixed and supported at only one side (cantilevered).

The support base 353A and the guide base 355A on the fixed side are fixed onto the table 45A and are not moved or adjusted in position with respect to the table 45A in the Y-axis direction. The support base 354A and the guide base 356A on the movable side are detachably fixed onto the table 45A, and are adjustable in position in the Y-axis direction. The support base 353A and guide base 355A can be fixed to each other, and the support base 354A and the guide based 356A can be fixed to each other.

The elongated holes are formed on the table 45A at different positions in the X-axis direction, and extend along the Y-axis direction. The support base 354A and the guide base 356A can be fixed at an arbitrary position of each of the elongated holes with a fastening member. The fastening member is, for example, a bolt and a nut. The fastening member and the elongated holes adjusts and fixes the position of the support base 354A and the guide base 356A in the X-axis, Y-axis and Z-axis directions with respect to the table 45A. Additional adjustment members like the positioning members 357 can be provided to adjust and fix the position of the support base 354A and the guide base 356A.

The conveying machine 1103B has substantially the same configuration as the conveying machine 1103A. The bottom rollers 33-1B on the fixed side are fixed on the support base 353B, the side rollers 32-1B on the fixed side are fixed on the guide base 355B, the bottom rollers 33-2B on the movable side are fixed on the support base 354B, and the side rollers 32-2B on the movable side are fixed on the guide base 356B. The support base 353B and the guide based 355B are fixed on the table 45B, while the support base 354B and the guide base 356B are detachably fixed on the table 45B and are adjustable in position in the Y-axis direction. The bottom and side rollers 33-1B, 33-2B, 32-1B, and 32-2B define a conveyance path of a mold. The conveying machine 1103B functions as location for the mold 100B to be at while injection molding with 100A is performed, while changes of the molds 100A and 100B to a new pair of molds are performed at the conveying machine 1103A. Therefore the conveyance path of the conveying machine 1103B is shorter than the conveyance path of the conveying machine 1103A. Since is no actuator provided with the conveying machine 1103B, the area of the table 45B is smaller than the table 45A.

According to the previously described embodiments, the conveyance path between the injection molding machine 2 and the conveying machine 3A, and the conveyance path between the injection molding machine 2 and the conveying machine 3B are formed by the rollers BR fixed to the roller supporting body 620 and the rollers SR fixed to the roller supporting body 630. According to the present exemplary embodiment, neither the fixed platen 61 nor the movable platen 62 includes the roller supporting bodies 620 or 630. Instead, the tables 45A and 45B extend into the inner area of the injection molding machine 2, as defined by the doors 80A and 80B. In order words, the conveyance paths of the conveying machine 1103A and 1103B are directly connected to the conveyance path of the injection molding machine 2. Therefore the doors 80A and 80B cannot be fully closed due to the extension of the tables 45A and 45B. However, the injection molding system with a single actuator in the present embodiment is supposed to be operated in the mode illustrated in FIGS. 6A and 6B. The injection molding and conveyance of the molds are performed while the doors 80A and 80B are not closed.

According to the present embodiment, the process of exchanging molds (mold setup process) is performed at the conveying machine 1103A. In other words, both the molds 100A and 100B can be unloaded from the conveying machine 3A after both the molds 100A and 100B are located on the conveying machine 1103A.

When the molds 100A and 100B are replaced by a new pair of molds, the positions of the support base 354B and the guide base 356B may need to be changed to adjust for the change of the width of the molds, especially for the change of the width of the molds on the conveying machine's 1103B side.

FIG. 12B is a schematic drawing illustrating a change of the position of the support base 354A and the guide base 356A when molds different in width from molds 100A and 100B are used. While the width in a clamping direction of the mold 100A is α, the width in a clamping direction of a new mold 1201A to replace the mold 100A is β. FIG. 12B illustrates where the mold 100A and the mold 1201A is positioned on the conveying machine 1103A.

When the mold 100A is replaced by the mold 1201A, the position in the Y-axis direction of the support base 354A and the guide base 356A are shifted in the Y-axis positive direction by (β−α) in order to make adjustments for the change in the width of the mold. The maximum amount of the shift allowed can be defined by the length of the elongated hole formed on the table 45A. The length of the elongated hole is also defined by a difference between the maximum width of a mold allowed to be used in an injection molding machine, and the minimum width of a mold allowed to be used in the same injection molding machine. The positions of the support base 353A and the guide base 355A are not changed and defines reference positions.

Figure 13A:
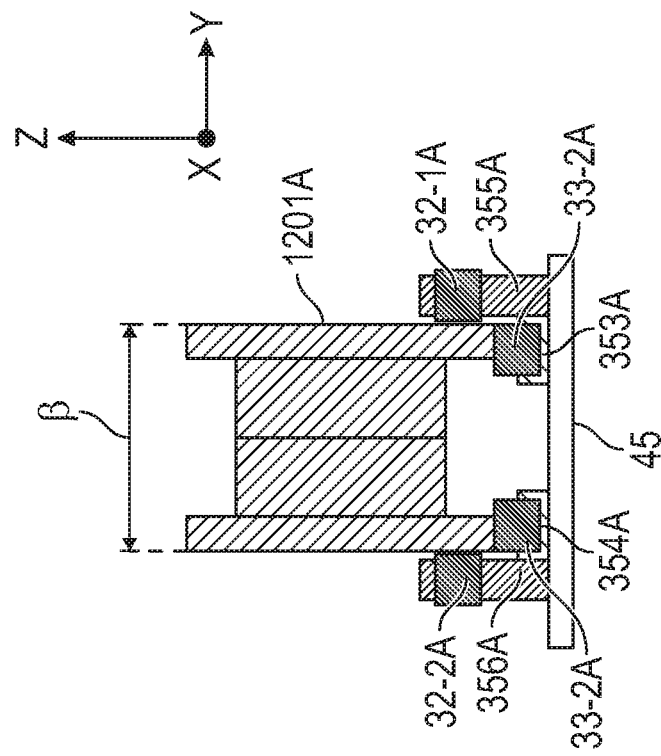
FIGS. 13A and 13B illustrate a process of exchanging molds at a conveying machine.
Figure 13B:
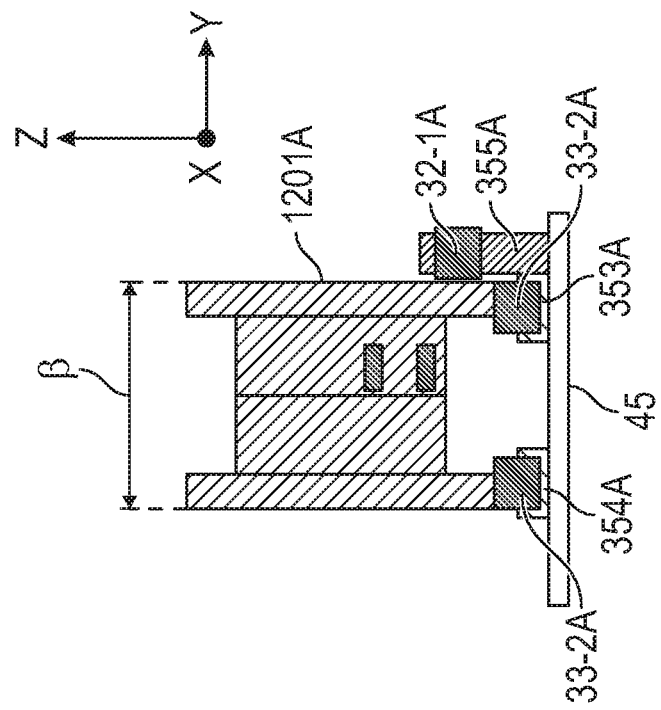

FIGS. 13A and 13B illustrate a process of exchanging molds at a conveying machine. More specifically, FIGS. 13A and 13B illustrate a situation where the mold 1201A replaces the mold 100A. The situation illustrated in FIG. 13A corresponds to step S1005 of loading the mold 1201A, and the situation illustrated in FIG. 13B corresponds to step S1006 of attaching guide base 356A to the conveying machine 1103A.

Turning to FIG. 13A, the mold 1201A is placed so that a clamping plate (not illustrated) of the mold 1201A on the fixed side is on the bottom rollers 33-1A on the fixed side, and a clamping plate (not illustrated) of the mold 1201A on the movable side is on the bottom rollers 33-2A on the movable side. The mold 1201A is moved towards the side rollers 32-1A on the fixed side so that the mold 1201A contacts the side rollers 32-1A or so only a slight gap (e.g., approx 1 mm) between the new mold and the side rollers 32-1A. This is done to adjust the position of the side rollers on the movable side.

Turning to FIG. 13B, the guide base 356A is placed to contact the support base 354A on their side surfaces, and fixed on the table 45A by engaging a fastening member with the elongated hole formed on the table 45A. The elongated hole can be shared with the guide base 356A and the support base 354A. The guide base 356A can also be fixed to the support base 354A with a fastening member.

In the above-described embodiments, clamping, injection/dwelling, opening, and ejection are performed in a state where the mold is at the molding operation position 11 of the injection molding machine 2. In another exemplary embodiment, all of these processes do not need to be performed at the molding operation position 11. Some of the processes can be performed at a position different from the molding operation position 11.

In the above-described embodiments, a cooling process is performed in a state where the mold is on the conveying machines. In another exemplary embodiment, the cooling process does not need to be performed on the conveying machines and can be performed at a position where the mold does not contact the fixed platen 61 and the movable platen 62. For example, the cooling process can be performed in a state where a part of the mold is in the injection molding machine and another part of the mold is outside the injection molding machine. For example, in a configuration where a part of either conveying machine is located in the injection molding machine, the cooling process can be performed in a state where a part of the mold is in the injection molding machine and another part of the mold is on either of the conveying machines.

In the injection molding system with a single actuator according to the embodiment illustrated in FIG. 11, the molds 100A and 100B are connected with each other, there can be difficulty in performing injection molding in the mode illustrated in FIGS. 7A and 7B because the door 80B cannot be closed even when the injection molding is performed with the mold 100A. To appropriately perform injection molding in the mode illustrated in FIGS. 7A and 7B, a connection member can include a disengaging and re-engaging mechanism, where the connection member is disengaged from one mold while injection molding is performed with the other mold. This enables the door to be fully closed.

In another exemplary embodiment, multiple moving doors can be implemented so that the connection member is engaged with a mold) while the opening on the side of the injection molding machine is covered by the multiple moving doors. This enables safely covering openings and avoiding an operator from contacting moving components in the injection molding machine.

In yet another exemplary embodiment, the conveying machine 3A is provided with the injection molding machine 2 but the conveying machine 3B is not provided.

Any possible combinations of the above described embodiments can also be embodiments of the present disclosure. For example, in the injection molding system with a single actuator as illustrated in FIG. 11, the guide bases 355 and 356 can be fixed onto the support bases 353 and 354 with the L-shaped bracket 920.

In referring to the description, specific details are set forth in order to provide a thorough understanding of the examples disclosed. In other instances, well-known methods, procedures, components and circuits have not been described in detail as not to unnecessarily lengthen the present disclosure.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

The methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

What is claimed is:

1. An injection molding system comprising:
   an injection molding apparatus; and
   a conveying apparatus for conveying a mold with respect to the injection molding machine, the conveying apparatus comprising:
   a support member for supporting a bottom of the mold; and
   a guide member located on a side of the mold for guiding the mold conveyed by the conveying apparatus,
   wherein the improvement to the conveying apparatus includes:
   an adjustment member for adjusting a position of the guide member in a direction intersecting a direction of conveyance of the mold by the conveying apparatus independently from a position of the support member.

2. The injection molding system according to claim 1, the conveying apparatus further comprising:
   a support base for supporting the support member; and
   a guide base detachably fixed to the support base for supporting the guide member.

3. The injection molding system according to claim 1, wherein the support member includes multiple rollers rotatable about an axis along a clamping direction of the mold.

4. The injection molding system according to claim 1, wherein the guide member includes multiple rollers rotatable about an axis along a vertical direction.

5. The injection molding system according to claim 1,
   wherein the support member includes a first row and a second row of support members,
   wherein the first row is located on a movable mold's side of the mold and the second row is located on a fixed mold's side of the mold,
   wherein the guide member includes a first row and a second row of guide members,
   wherein the first row is located on a movable mold's side of the mold and the second row is located on a fixed mold's side of the mold, and
   wherein the adjustment member is configured to adjust a position of the first row of the guide member in a clamping direction of the mold.

6. The injection molding system according to claim 5, wherein the conveying apparatus further comprises another adjustment member for adjusting a position of the first row of the support member in the clamping direction of the mold.

7. The injection molding system according to claim 6, the conveying apparatus further comprising:
   a support base on which the first row of the support member and the first row of the guide member are located,
   wherein the another adjustment member is configured to adjust a position of the support base, and wherein the adjustment member is configured to adjust a position of the first row of the guide member with respect to the support base.

8. The injection molding system according to claim 7, the conveying apparatus further comprising:
a guide base fixed on the support base, adjustable in position with respect to the support base,
wherein the first row of the guide member includes multiple rollers rotatably fixed onto the guide base, and
wherein the adjustment member is configured to adjust a position of the guide base.

9. The injection molding system according to claim 6, the conveying apparatus further comprising:
a first support base on which the first row of support members and the first row of guide members are located; and
a second support base on which the second row of support members and the second row of guide members are located,
wherein the another adjustment member is configured to adjust a position of the first support base with respect to the second support base.

10. The injection molding system according to claim 9, wherein
the another adjustment member includes an elongated hole formed on a top plate of the conveying apparatus, extending along the clamping direction of the mold; and
a fastening member for fastening the first support base at at least one position along the elongated hole.

11. The injection molding system according to claim 9, wherein
the adjustment member includes an elongated hole formed on the first support base extending along the clamping direction of the mold; and
a fastening member for fastening a guide base at at least one position along the elongated hole, the guide base being fixed on the first support base and adjustable in position with respect to the first support base.

12. A conveying apparatus for conveying a mold with respect to an injection molding apparatus, the conveying apparatus comprising:
a support member with a first row of support members and a second row of support members for supporting a bottom of a mold;
a guide member with a first row of guide members and a second row of guide members for guiding the mold, wherein the first row of guide members is on a movable mold side of the mold and the second row of guide members is on a fixed mold side of the mold;
a first support base on which the first row of support members is located;
a second support base on which the second row of support members is located;
an adjustment member for adjusting a position of the first support base; and
a guide base detachably attached to the conveying apparatus on which the first row of guide members is located.

13. A method for exchanging molds for an injection molding apparatus and a mold conveying apparatus, the mold exchange method comprising:
conveying a mold out of the injection molding apparatus;
removing, from the conveying apparatus, a guide member configured to guide movement of the mold, wherein the guide member is located on a movable mold side of the mold;
unloading the mold from the conveying apparatus;
adjusting a position of a support member of the conveying apparatus configured to support a bottom of the mold, wherein the support member is located on the movable mold side;
loading a different mold onto support member of the conveying apparatus;
attaching the guide member to the conveying apparatus; and
conveying the different mold into the injection molding machine.

14. The method according to claim 13, wherein attaching the guide member includes adjusting a position of the guide member in a clamping direction of the different mold.

* * * * *